United States Patent
Altmikus et al.

(10) Patent No.: US 10,138,868 B2
(45) Date of Patent: Nov. 27, 2018

(54) ROTOR BLADE TRAILING EDGE

(71) Applicant: Wobben Properties GmbH, Aurich (DE)

(72) Inventors: Andree Altmikus, Aurich (DE); Mohammad Kamruzzaman, Aurich (DE)

(73) Assignee: Wobben Properties GmbH, Aurich (DE)

( * ) Notice: Subject to any disclaimer, the term of this patent is extended or adjusted under 35 U.S.C. 154(b) by 727 days.

(21) Appl. No.: 14/649,903

(22) PCT Filed: Dec. 5, 2013

(86) PCT No.: PCT/EP2013/075647
§ 371 (c)(1),
(2) Date: Jun. 4, 2015

(87) PCT Pub. No.: WO2014/086919
PCT Pub. Date: Jun. 12, 2014

(65) Prior Publication Data
US 2015/0316029 A1 Nov. 5, 2015

(30) Foreign Application Priority Data

Dec. 7, 2012 (DE) .................. 10 2012 023 895
Feb. 21, 2013 (DE) .................. 10 2013 202 881

(51) Int. Cl.
*F03D 1/06* (2006.01)
*F03D 80/00* (2016.01)

(52) U.S. Cl.
CPC ......... *F03D 1/0683* (2013.01); *F03D 1/0633* (2013.01); *F03D 80/00* (2016.05);
(Continued)

(58) Field of Classification Search
CPC ...... F03D 1/0683; F03D 80/00; F03D 1/0633; F05B 2250/183; F05B 2260/96
(Continued)

(56) References Cited

U.S. PATENT DOCUMENTS 5,088,665 A * 2/1992 Vijgen .................. B64C 23/06
244/198
5,533,865 A * 7/1996 Dassen ................. F03D 1/0608
244/200

(Continued)

FOREIGN PATENT DOCUMENTS

CN        101498276 A     8/2009
DE  10 2008 037 368 A1   4/2009
(Continued)

OTHER PUBLICATIONS

Bulder et al., "Theory and User Manual BLADOPT," ECN-C-01-011, Energy Research Centre of the Netherlands ECN, Aug. 2001, retrieved from http://www.ecn.nl/docs/library/report/2001/c01011.pdf, on Jun. 1, 2015, 98 pages.

(Continued)

*Primary Examiner* — Aaron R Eastman
(74) *Attorney, Agent, or Firm* — Seed Intellectual Property Law Group LLP

(57) ABSTRACT

A method for calculating a trailing edge that is to be produced for a rotor blade of an aerodynamic rotor of a wind power installation, wherein the rotor blade has radial positions with respect to the rotor, the rotor blade has a local blade profile that is a function of the radial positions with respect to the rotor and the trailing edge has a jagged profile having a plurality of spikes, wherein each spike has a spike height and a spike width, and the spike height and/or the (Continued)

spike width is calculated as a function of the radial position thereof and/or as a function of the local blade profile of the radial position thereof.

19 Claims, 10 Drawing Sheets

(52) U.S. Cl.
CPC ..... *F05B 2250/183* (2013.01); *F05B 2260/96* (2013.01); *Y02E 10/721* (2013.01); *Y02P 70/523* (2015.11); *Y10T 29/49337* (2015.01)

(58) Field of Classification Search
USPC ........................................................ 416/228
See application file for complete search history.

(56) References Cited

U.S. PATENT DOCUMENTS

| | | | | |
|---|---|---|---|---|
| 5,603,607 | A * | 2/1997 | Kondo | F04D 29/384 |
| | | | | 415/119 |
| 7,059,833 | B2 | 6/2006 | Stiesdal et al. | |
| 2003/0175121 | A1* | 9/2003 | Shibata | F03D 1/0641 |
| | | | | 416/131 |
| 2009/0074585 | A1 | 3/2009 | Koegler et al. | |
| 2009/0324416 | A1* | 12/2009 | Bonnet | F03D 1/0633 |
| | | | | 416/223 R |
| 2011/0142666 | A1 | 6/2011 | Drobietz et al. | |
| 2013/0149162 | A1 | 6/2013 | Smith et al. | |
| 2014/0227101 | A1 | 8/2014 | Yao | |
| 2016/0177919 | A1 | 6/2016 | Van Garrel et al. | |

FOREIGN PATENT DOCUMENTS

| | | |
|---|---|---|
| DE | 10 2011 055 327 A1 | 5/2012 |
| DE | 102011050661 A1 | 11/2012 |
| EP | 0 652 367 A1 | 5/1995 |
| EP | 1 314 885 B1 | 8/2007 |
| JP | 2000120524 A | 4/2000 |
| JP | 2003336572 A | 11/2003 |
| SU | 2694 A1 | 4/1927 |
| SU | 1740767 A1 | 6/1992 |
| UA | 54439 U | 11/2010 |
| WO | 2012156359 A1 | 11/2012 |
| WO | 2015016704 A1 | 2/2015 |

OTHER PUBLICATIONS

Corcos, "The structure of the turbulent pressure field in boundary-layer flows," *Journal of Fluid Mechanics* 18(Part 3):353-378, Mar. 1964.

Herrig, *Validation and Application of a Hot-Wire based Method for Trailing-Edge Noise Measurements on Airfoils*, Verlag Dr. Hut, Munich, Germany, 2012, 119 pages.

Howe, *Acoustics of Fluid-Structure Interactions*, Cambridge University Press, Cambridge, United Kingdom, 1998, 572 pages.

* cited by examiner

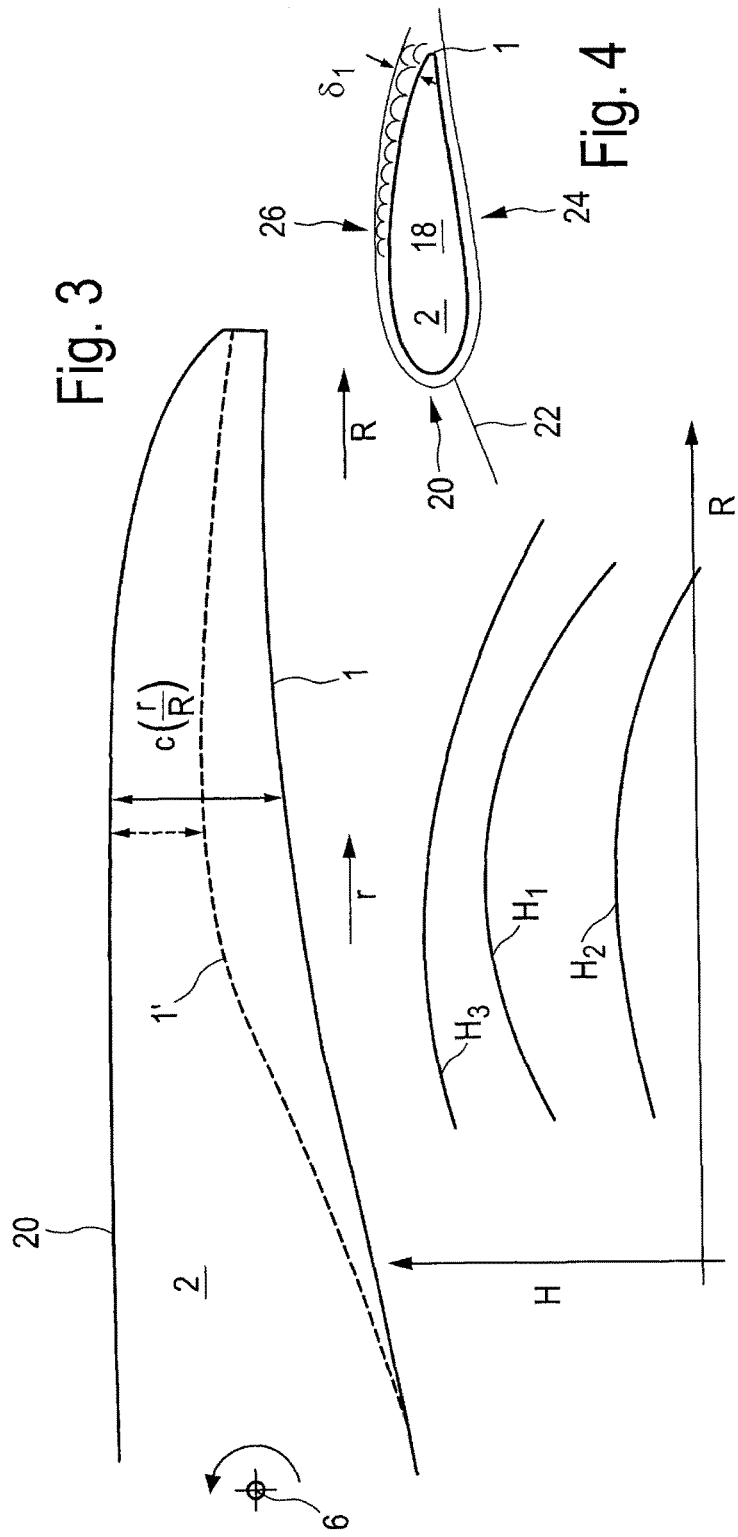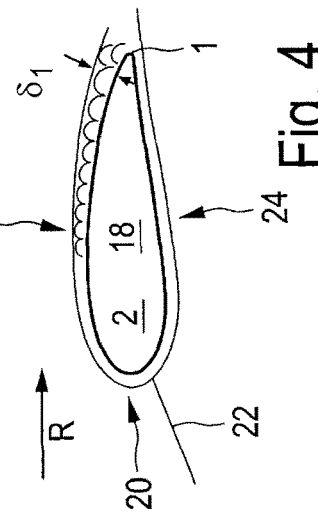

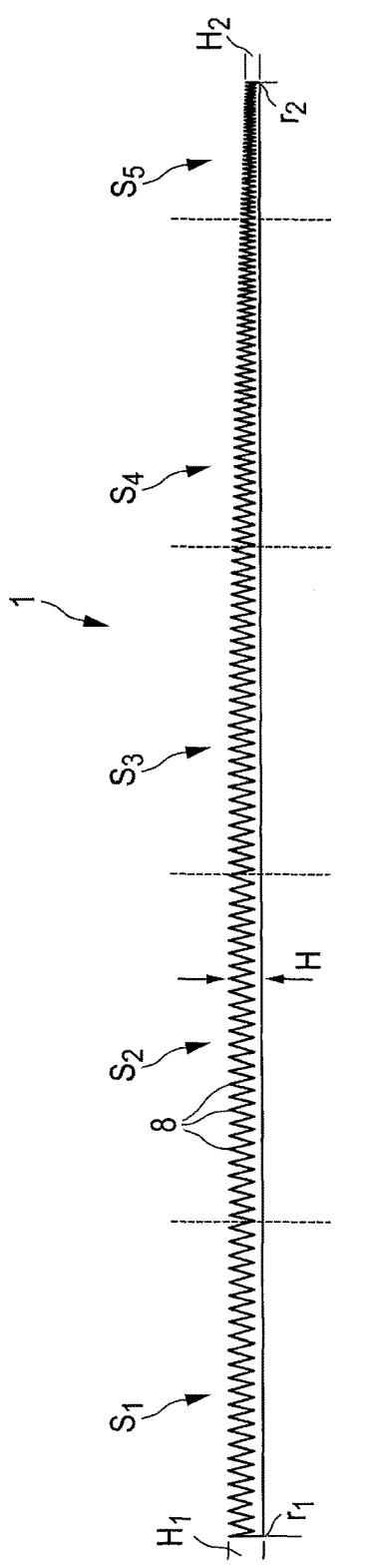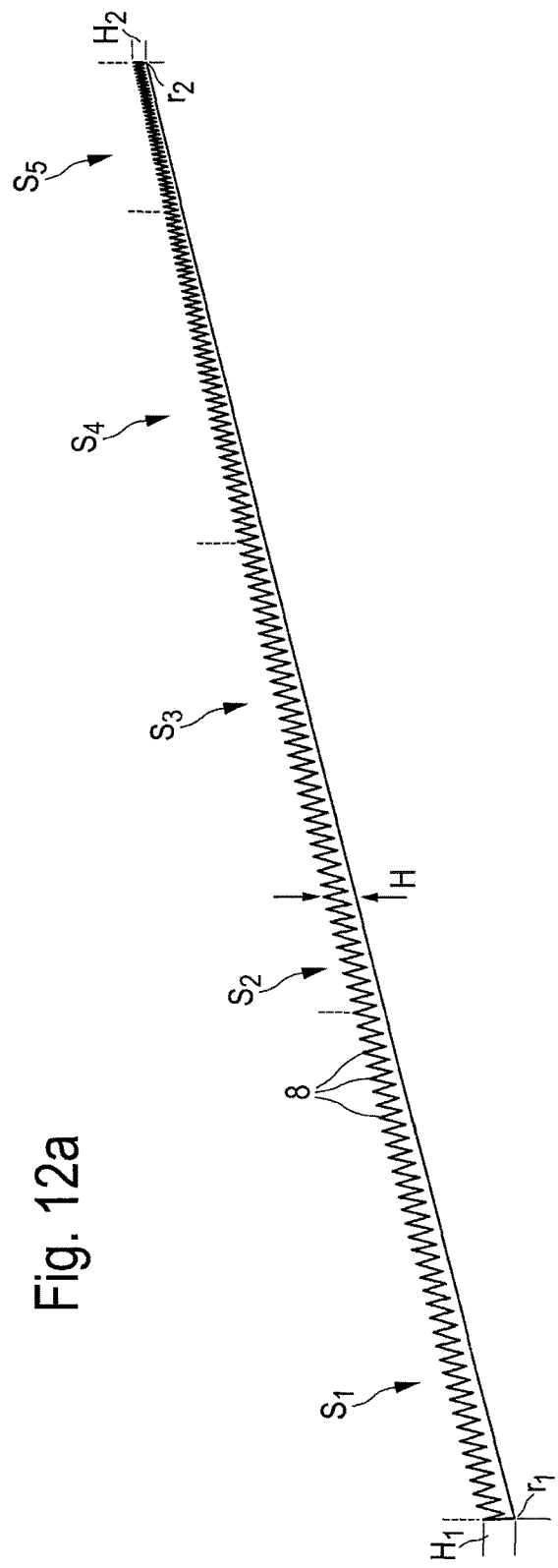
Fig. 12a
Fig. 12b

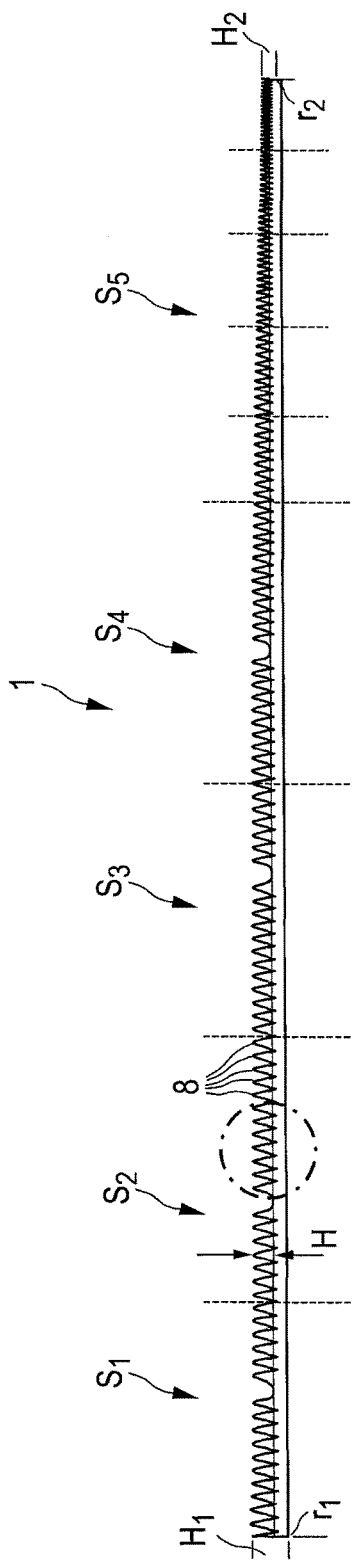
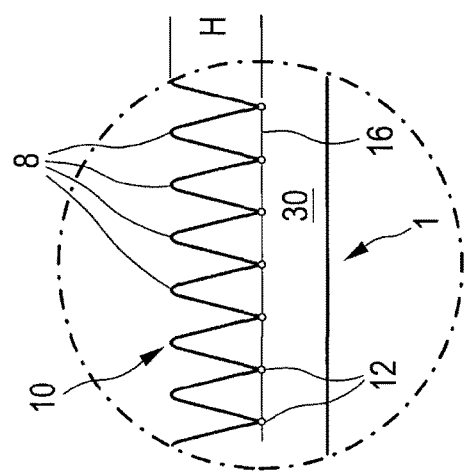
Fig. 13a
Fig. 13b

ROTOR BLADE TRAILING EDGE

BACKGROUND

Technical Field

The invention relates to the design of the trailing edge of a rotor blade of a wind power installation, or to a method for calculating a trailing edge to be produced respectively. Furthermore, the present invention relates to a trailing edge for a rotor blade and the invention relates to a rotor blade having a trailing edge. Moreover, the present invention relates to a wind power installation having at least one rotor blade having a trailing edge.

Description of the Related Art

Wind power installations are generally known and FIG. 1 shows a known wind power installation. The design of the rotor blade or of the rotor blades respectively is an aspect that is important to the efficiency of the wind power installation. In addition to the basic profile of the rotor blade, the rotor blade trailing edge also has an influence on the behavior of the rotor blade.

In this context, saw tooth-shaped trailing edges or trailing edges having a jagged profile having a plurality of spikes respectively have also been proposed. However, providing such a saw tooth-shaped trailing edge can be expensive and there is a risk that providing a jagged trailing edge or saw tooth-shaped trailing edge respectively will create an expense that is not proportional to the effect.

From EP 0 652 367 A1, it is known that the trailing edge should be saw-tooth shaped in the longitudinal direction of the main spar of the rotor blade, in order to reduce the noise level.

From EP 1 314 885 B1, it is known that the trailing edge should be saw-tooth shaped in the longitudinal direction of the main spar of the rotor blade and, at the same time, flexible, in order to increase the torque that the rotor blade exerts on the generator.

BRIEF SUMMARY

One or more embodiments of the present invention may address at least one of the problems mentioned above. In one embodiment, a solution is proposed that further increases the effectiveness of a rotor blade of a wind power installation.

One or more embodiments of the invention increase the effectiveness of a rotor blade without increasing the noise effects. An alternative solution should at least be provided.

For this purpose, a rotor blade is proposed, the trailing edge of which is designed in a saw-tooth shape in the longitudinal direction of the main spar of the rotor blade, wherein the distance and/or length are functionally dependent on the local flow conditions at the blade profile and the thickness of the turbulent boundary layer that develop therefrom, or on the coherence length scales of the bales of turbulence with the pressure fluctuations forming therein respectively. The length of the individual teeth should preferably change from tooth to tooth.

Consequently, a saw tooth-shaped trailing edge is proposed, which accordingly has a plurality of spikes or teeth, which terms are used synonymously here, which taper to a point away from the rotor blade, essentially towards the rear, namely the side facing away from the intended rotational movement of the rotor. Accordingly, the spaces between respectively two spikes or teeth taper to a point in the direction of the rotor blade. Such spikes have a height, namely the distance from the base line, at which the spaces that taper to a point end, to the crown line, at which the spikes that taper to a point end, as the crown line, which connects the spike tips. This base line and this crown line may be curved lines and may have a variable distance from one another along the length of the blade.

The length of the individual teeth can synonymously be referred to as the height of the teeth or the height of the spikes respectively, thus as the spike height.

According to one embodiment of the invention, a method is proposed for calculating a trailing edge to be produced. Thus, a trailing edge is proposed which is to be produced for a rotor blade of an aerodynamic rotor of a wind power installation. The rotor blade has radial positions with respect to this rotor, in which the rotor blade is to be used or is used respectively. A radial position of the trailing edge and of the rotor blade thus always refers to this rotor, thus to the distance from the rotation axis of the rotor. This approach is also used as a basis for a rotor blade that is initially not yet installed. A rotor blade of a wind power installation is essentially adapted to a specific wind power installation, in particular to the rotor having this rotor blade and usually two additional rotor blades.

For that purpose, the rotor blade has a local blade profile at each radial position. In other words, each blade profile has its own blade profile depending on its radial position.

The trailing edge has a jagged profile having a plurality of spikes, which can also be referred to as saw tooth-shaped. Here, the individual spikes are essentially mirror symmetrical, and thus have two oblique, approximately identical flanks. In particular, these teeth regularly do not have a vertical and an oblique flank, but rather, two oblique flanks.

Each spike has a spike height and a spike width. The spike height is the distance between a base line and a crown line already described above. The spike width is the distance of the respective end of the two spaces that taper to a point, which spaces delimit the spike. As a first approximation, the width of the spike is the distance from the spike tip thereof to the spike tip of an adjacent spike. These spikes of a proposed spike-shaped trailing edge preferably differ from one another, however this difference is comparatively small for immediately adjacent spikes.

It is now proposed that the spike height and, in addition or alternatively, the spike width, be calculated as a function of the radial position thereof. Thus there is a separate calculation for each spike, depending on the radial position thereof. As a result, a trailing edge is hereby created having many spikes, which were calculated individually and accordingly may have individual sizes, which in particular change quasi continuously across the length of the rotor blade with increased or decreased radial position respectively.

The spike height and, in addition or alternatively, the spike width, is preferably calculated as a function of the local blade profile of the radial position thereof. The blade profile of the radial position of a spike, or in other words the profile of the blade profile in this radial position, is thus considered.

According to one embodiment, it is proposed that the spike height be greater than the spike width and that the spike width be calculated from the spike height. The ratio of the spike height to the spike width falls in the range of 0.5 to 10, in particular 3 to 5 for this calculation. Preferably it has a value of approximately 4, in particular a value of 2. The spike width $\lambda$ can thus be calculated from the spike height H according to the formula:

$$\lambda = H/k_n \text{ where } k_N = [0{,}5 \ldots 10], \text{ in particular } k_N = 2$$

The spike is thus comparatively narrow and, in particular, tapers to an acute angle. A ratio in this range has proven to be particularly advantageous in minimizing noise, at least for those individually calculated spikes. Especially in the case that the spike height is in a fixed ratio to the spike width, the result is the same whether the spike height is calculated first and then the spike width calculated therefrom, or whether the spike width is first calculated and then the spike height calculated therefrom.

The spikes preferably have different spike widths and/or different spike heights and thereby differ from one another individually.

The calculation is preferably set up in such a way that, in the case of trailing edges for low-wind locations, the spike height of the spikes decreases with reference to the profile depth as the radius of the radial position of the spikes thereof increases, while in the case of trailing edges for strong-wind locations, the spike height of the spikes increases with reference to the profile depth as the radius of the radial position of the spikes thereof increases. This is due to the wind class-specific blade design.

In the wind energy industry, it is common to classify sites according to wind classes. As a rule, stronger wind can be expected in strong-wind locations, which exist in particular in the coastal regions or off-shore locations. The wind power installation, in particular the rotor blades, are designed accordingly, namely so that they can stand up to strong winds, and the wind power installation can thereby also be operated such that they are able to capture less energy from the wind than with a wind power installation for low-wind locations.

Accordingly, wind power installations for low-wind locations, which predominate in particular at inland locations, are designed in such a way that they do not need to be able to stand up to strong winds, or at least not during operation, but must be regulated at least for wind forces for which a wind power installation for a strong-wind location would not yet require regulation. In turn, a wind power installation of this kind for low-wind locations can capture more energy in weak wind. A person skilled in the art is familiar with classifications of this kind and, in some cases, might distinguish even more sub-classifications.

According to one embodiment, it is thereby proposed that the calculation be set up in such a way that spike heights decrease with reference to the profile depth for rotor blades of wind power installations for low-wind locations as the radius increases. For example, in the case of a trailing edge for a low-wind location, the slope of the change in spike height H $$\frac{\partial(H/c)}{\partial(r/R)} = [-15 \ldots -25], \text{ in particular} = -20$$

for a standardized radius can be from 0.6 to 0.8 with reference to the radius. Thus there is a decrease in the spike height and here, the spike height H in relation to the profile depth c is considered in the numerator, and the Radius r in relation to the maximum radius of the rotor blade R is considered in the numerator. The spike height in reference to the profile depth preferably has a constant progression between r/R=0.75 and r/R=0.9, and first drops off again to the maximum radius R at r/R=0.9. This is also illustrated in FIG. 10.

For a trailing edge for a wind power installation of the same power class, but for a strong-wind location, the corresponding ratio may be positive and may have a value of +20 because the spike height, which can also be referred to as the spike depth, increases. The spike height reaches a maximum at 0.85r/R and then undergoes a strict monotonic decrease to the blade tip.

Such a calculation of the trailing edge based on the wind class accommodates various problems that arise according to the wind class.

The spike height and/or the spike width is preferably calculated as a function of the local radius thereof by means of a polynomial relationship, preferably a fourth to eighth degree polynomial relationship, in particular fifth or sixth degree, in particular sixth degree for low-wind locations and fifth degree for strong-wind locations. The characteristic progression of spike heights may differ fundamentally between low-wind locations and strong-wind locations. This can be accounted for by using polynomials of different grades for low-wind locations and strong-wind locations.

The calculation is preferably dependent on one or more anticipated noise spectra. In addition or alternatively, the calculation depends on one more operating points. It is thus proposed that the behavior of the wind power installation be concretely taken into account for at least one operating point. In this respect, an operating point of this kind is an idealized, stationary operating point, which in particular is defined by a wind speed, a rotational speed of the rotor of the wind power installation and/or power generated by the wind power installation. The blade angle of the rotor blade to the wind can also influence this operating point.

An anticipated noise spectrum is now determined for at least one such operating point, namely a noise level or a sound level or a noise threshold as a function of the frequency of this noise. As a rule, this results in a frequency-dependent progression having a maximum value. This spectrum is included in the calculation. In particular, the frequency of this spectrum at which this maximum value is reached is taken into account. This frequency can be referred to as the peak frequency or maximum frequency, and in German is also frequently referred to as "peak frequency." If the operating point is now modified, a new spectrum and therefore a new peak frequency arises. Thus frequency spectra and therefore peak frequency values may be recorded for each individual spike at a plurality of operating points. In order to calculate the relevant spikes, a peak frequency is used for that purpose, and one peak frequency can be selected from among the plurality of peak frequencies that were determined. The peak frequency that is used can also be an averaged value from the plurality of peak frequencies that were recorded. The recording and evaluation of frequency spectra is also explained as an example in FIG. 6.

In order to record these frequency spectra and ultimately the respective peak frequencies, it is possible to conduct tests in a wind tunnel. Likewise, there are simulation methods that can be used to determine spectra and peak frequencies of this kind.

The set operating point and, if applicable, also the modification of the operating points are based in particular on real operating points. Here, many control processes of a wind power installation work in such a way that an operating point is essentially assigned to each wind speed. This can at least be assumed, by way of simplification, when effects such as different levels of turbulence, very strong wind, or very strongly increasing or decreasing wind are omitted from considerations by way of simplification. Thus two or three or four specific operating points are preferably selected from the range of wind speeds, which should cover the wind power installation in question.

The effective flow velocity that is assigned to the respective operating point is preferably included in the calculation of the respective spike, in particular spike height. The effective or local flow velocity $V_{eff}$ is the speed that arises from the perspective of the rotor blade at the appropriate position, thus at the appropriate radial position, from the vectorial addition of the wind speed and the movement velocity of the rotor blade at this position.

The calculation is preferably carried out depending on the respective local profile. Thus the profile is included in the calculation or may also be included in measurements taken during tests in the wind tunnel. The local flow velocity may also depend upon the profile and/or upon the position of the rotor blade and therefore upon the position of the profile.

The calculation of the spike height H of a prescribed radial position is preferably carried out based on the associated flow velocity $V_{eff}$, the associated peak frequency $f_{peak}$ of the noise spectrum of an operating point, and depending on a predetermined factor k, which can be determined empirically and which, for example, may also exist as an empirical value. On this basis, the spike height H can then be calculated according to the formula:

$$H = k \cdot \frac{V_{eff}}{f_{peak}}$$

This calculation is based on the following consideration.

The spike height H is calculated from the coherence length scale $\Lambda_{p,3}$ or $\Lambda_{p3}$ of the turbulent pressure fluctuation within the meaning and with the help of the Corcos model [3] respectively, and by using a constant factor $c_2$ according to the following equation:

$$H = c_2 \cdot \Lambda_{p3}.$$

The factor $c_2$ can be determined empirically, for example from test measurements. Empirical values may also be used for $c_2$. $\Lambda_{p3}$ is a function of the radius of the rotor, in which the rotor blade is used. The coherence length scale $\Lambda_{p3}$ can be calculated from the convection velocity $U_c$ and the peak frequency $f_{peak}$, which is also known in German-speaking countries as the peak frequency, according to the following calculation:

$$\Lambda_{p3} = \frac{U_c}{(2 \cdot \pi \cdot f_{peak})}.$$

The convection velocity $U_c$ is calculated from the effective or from the local flow velocity $V_{eff}$ respectively at the blade profile by means of the constant $c_1$, which can be determined empirically through testing or simulations and in particular has the value 0.7 ($c_1$=0.7), according to the equation:

$$U_c = c_1 \cdot V_{eff}$$

The effective or local flow velocity $V_{eff}$ respectively is calculated with the help of a blade element momentum method, which is also known by the acronym BEM (from the English term, "Blade Element Momentum method").

The pitch angle of the rotor blade, the rotational speed of the rotor, the wind speed as well as the concrete radius and the blade profile of the blade profile at the radial position and the local torsional angle thereof on the rotor blade are included in this calculation, for which the flow velocity $V_{eff}$ and therefore the spike height H are to be calculated. The calculation is thus carried out for a specific operating point.

The peak frequency $f_{peak}$ is the frequency at which the greatest noise level occurs or is to be anticipated, respectively, for the operating point being examined and the radial position on the rotor blade being examined, in reference to the rotor. Thus, it is the frequency at which a trailing edge noise spectrum or trailing edge sound spectrum respectively is at its maximum.

The peak frequency $f_{peak}$ can be determined empirically, for example by conducting dedicated experiments in the wind tunnel, for example with dynamic pressure sensors at the trailing edge of the wind tunnel specimen, or can be calculated using a numerical aeroacoustic simulation for the local Reynolds number Re. The local Reynolds number is obtained from the local angle of incidence α, the local flow velocity and the local profile depth, and can also be obtained as a result using the specified BEM. Furthermore, the two-dimensional profile geometry of the local blade profile is also included.

The spike height H is thus calculated from the following ratio of the flow velocity $V_{eff}$ to the peak frequency $f_{peak}$ of the noise spectrum according to the formula:

$$H = \frac{c_2 \cdot c_1 \cdot V_{eff}}{(2 \cdot \pi \cdot f_{peak})} = \frac{k \cdot V_{eff}}{f_{peak}}$$

with $k = \frac{c_2 \cdot c_1}{(2 \cdot \pi)}$.

Here, $V_{eff}$ and $f_{peak}$ are dependent on the blade angle of the rotor blade, the rotational speed of the rotors, the wind speed as well as the concrete radius and the blade profile of the blade profile of the radial position on the rotor blade, for which the spike height H is to be determined.

What is moreover proposed in accordance with an embodiment of the invention is a trailing edge having a jagged profile, which has spikes having a spike height and spike width, wherein the spike height and/or the spike width is dependent on the radial position thereof and/or on the local blade profile of the radial position thereof.

Thus the relationships, explanations and advantages arise pursuant to at least one embodiment of the described method for calculating a trailing edge to be produced.

A trailing edge is preferably proposed that is calculated using a method pursuant to one of the embodiments described above.

A trailing edge for a rotor blade can also be referred to as a rotor blade trailing edge.

The calculation of the spike height H is preferably carried out for a predetermined radial position from the corresponding coherence length scale $\Lambda_{p3}$, taking into account a constant factor $c_2$ with the formula:

$$H = c_2 \cdot \Lambda_{p3}.$$

Consequently, for the spike of the corresponding radius, the coherence length scale for the same radius is included in the calculation. The coherence length scale $\Lambda_{p3}$ is a function that is dependent on the radius of the rotor and, accordingly, a function that is dependent on the radius arises for the spike heights of the trailing edge. The amplitude of this function can be proportionally increased or decreased by means of the constant factor $c_2$, whereby the basic progression of this function is not changed, however. A range can be spanned by a curve having a very small $c_2$ and an additional curve having a very large $c_2$, in which an advantageous function for the spike heights can be selected.

A rotor blade for a wind power installation having a trailing edge pursuant to at least one described embodiment is preferably proposed.

In addition, a wind power installation having one, and in particular, three such rotor blades is preferably proposed.

BRIEF DESCRIPTION OF THE SEVERAL VIEWS OF THE DRAWINGS

The invention is described in greater detail below, using embodiments as examples with reference to the accompanying figures.

FIG. 3 shows a schematic view of a section of a rotor blade in a top view having a schematic contour for a strong wind turbine and having a dashed line showing a deviating contour for a low wind turbine.

FIG. 4 shows a schematic view of a blade profile of a rotor blade having a schematically illustrated turbulence region.

FIG. 5 shows a schematic view of the progression of the spike height H pursuant to at least one embodiment as a function of the radius.

FIGS. 12a and 12b show a trailing edge for a strong wind turbine.

FIGS. 13a and 13b show a trailing edge for a low wind turbine.

DETAILED DESCRIPTION

The explanation of the invention based on examples and with reference to the figures is essentially schematic and the elements, which are explained in the respective figure, may be exaggerated for the sake of illustration, while other elements may be simplified. Thus, for example, FIG. 1 schematically illustrates a wind power installation in such a way that the provided, spike-shaped trailing edge is not visible.

Figure 1:
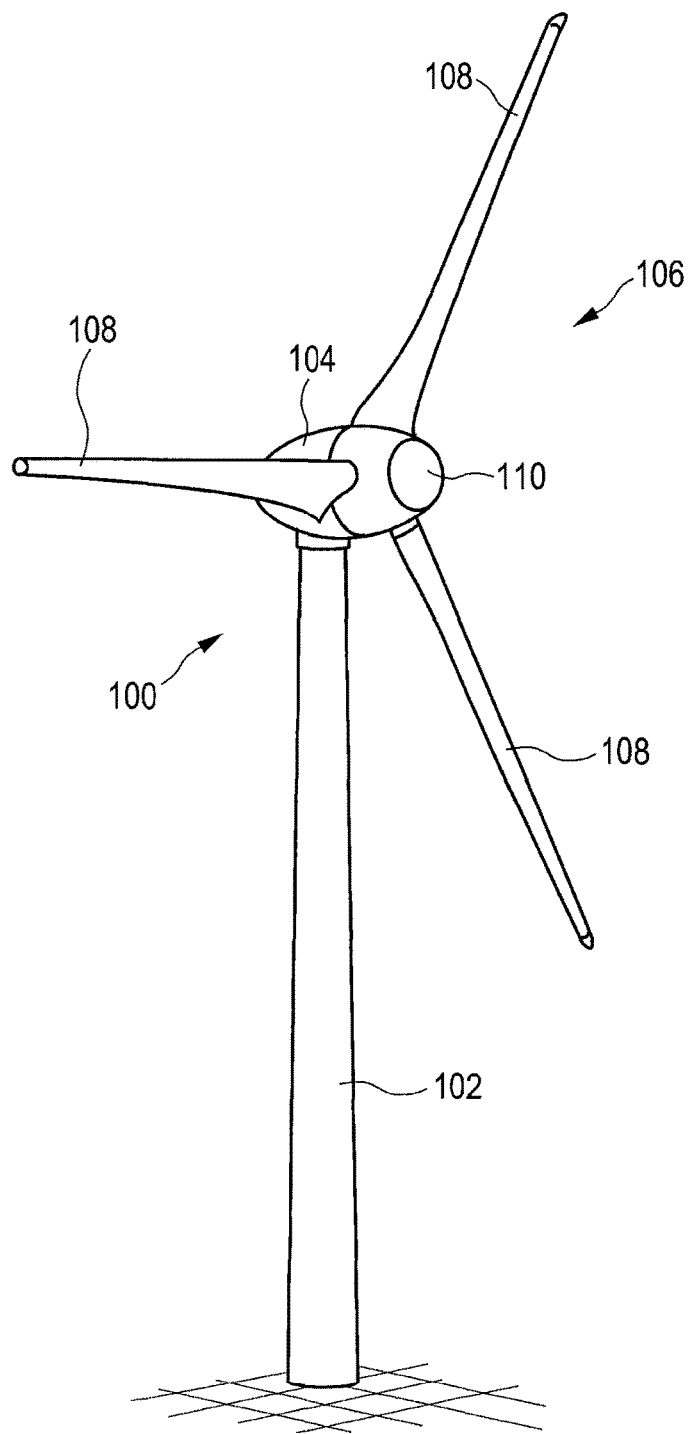
FIG. 1 shows the schematic perspective view of a wind turbine.

FIG. 1 shows a wind power installation 100 having a tower 102 and a nacelle 104. A rotor 106 with three rotor blades 108 and a spinner 110 is arranged on the nacelle 104. The rotor 106 is set in operation by the wind in a rotational movement and thereby drives a generator in the nacelle 104.

Figure 2:
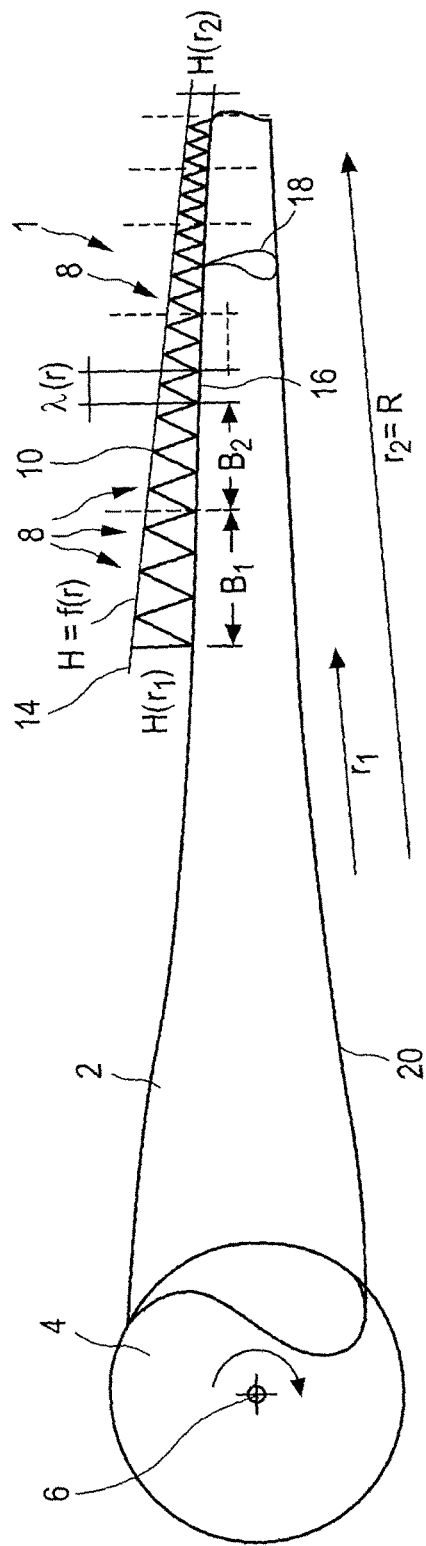
FIG. 2 shows a schematic view of a rotor blade having a trailing edge with a jagged profile having a plurality of spikes.

FIG. 2 shows a schematic view of a rotor blade 2 having rotor blade trailing edge 1, which, for the sake of simplicity, is also referred to as a trailing edge. The rotor blade is attached to a hub 4 as intended, which is indicated here only schematically, in order to rotate around a rotation axis 6 of the hub 4.

The trailing edge 1 has a jagged profile having a plurality of spikes 8, which are arranged adjacently along the rotor blade 2. This trailing edge 1 having the spikes 8 is arranged here only on the outer half of the rotor blade 2. Each spike has a radial position, which relates to the rotation axis 6. The first spike 8 starts at the radius $r_1$ and the last spike 8 ends at the radius $r_2$, which at the same time corresponds to the total radius R of the rotor blade 2 in reference to the rotation axis 6.

Each spike 8 has a height H, which depends on the respective radius r. The height H of the spikes 8 is thus a function of the radius r:

$$H=f(r).$$

Accordingly, the height of the spike 8 at the radius $r_1$ is the height $H(r_1)$, and the height H of the last spike is the height $H(r_2)$. The width of each spike 8 is indicated in FIG. 2 with the Greek letter λ, which likewise depends on the respective radius r and therefore is represented as λ(r).

Each spike 8 has a spike tip 10 and there is a recess having a recess apex 12 between each pair of spikes 8. A line connecting the spike tips 10 can be referred to as a crown line 14 and is shown as a dashed line in FIG. 2. A base line or baseline 16 connects the apexes of the recesses 12 and may, as is the case in the illustrated example in FIG. 2, illustrate a rear line of the rotor blade 2, which would form a trailing edge of the rotor blade 2 if the jagged trailing edge 1 that is shown were not present.

The distance between the crown line 14 and the base line 16 is not constant and, for the respective radius r, indicates the height H of the spike 8 arranged thereon. Accordingly, the height H of the spike 8 changes depending on the local radius r of the rotor blade 2. For layout or attachment, a plurality of spikes 8 can be grouped, as the shown widths $B_1$ and $B_2$ indicate. The calculation of the spikes 8, in particular the height H of the spikes 8, depends on the profile of the respective blade profile, and such a blade profile 18 of this kind is presented for the purpose of illustration.

The width λ or λ(r) respectively can also change with the radius r and, in particular, is in a fixed ratio to the height H of the respective spike 8. This ratio is preferably 2, so that the height H of a spike 8 is thus twice as large as the width λ of the same spike. If, according to other embodiments, the ratio of the height H to the width λ is significantly greater than 2, it can be especially useful for manufacturing considerations to form the current spikes 8 so that they are rectangular or approximately rectangular, so that a comb structure is created for the trailing edge, or the trailing edge has crenellations instead of spikes.

FIG. 3 shows a rotor blade 2, which may differ from the rotor blade 2 in FIG. 2, however. This rotor blade 2 in FIG. 3 has a leading edge 20 and a trailing edge 1, the spike-like progression thereof not being shown here for the sake of clarity. This rotor blade 2 having the leading edge 20 and the trailing edge 1 illustrates a basic form of a rotor blade of a strong wind turbine. As a comparison thereto, a trailing edge 1' is shown as a dashed line, which belongs to a rotor blade 2 of a low wind turbine, thus to a wind power installation for low-wind locations. For purposes of illustration, the rotation axis 6 is shown, in order to illustrate the rotational direction of the blade 2 and to render the side of the rotor blade 2 facing the hub, thus facing the rotation axis 6.

In any case, it can be seen in the illustration in FIG. 3 that a rotor blade of a low wind turbine has a slimmer design, in particular in the outer region, than a rotor blade of a strong wind turbine. FIG. 3 is only intended to illustrate this and it must be pointed out that it can be expected that a rotor blade of a low wind turbine will tend to be longer, thus having a larger radius than a rotor blade of a low wind turbine of the same power class.

FIG. 4 illustrates flow conditions on a rotor blade 2 of a wind power installation. FIG. 4 thereby shows a blade profile, which may be the blade profile 18 pursuant to FIG. 2, for example. Inflowing wind 22, which is simply shown as a line here, splits at the rotor blade 2 in the region of the leading edge 20 thereof and initially continues in a laminar flow. In particular, there is a laminar flow of wind flows on the pressure side 24 up to the vicinity of the trailing edge 1. A boundary layer in which turbulence or eddies may form arises at the suction side 26. The thickness of the boundary layer increases with increased proximity to the trailing edge. The thickness is shown here as $\delta_1$. This increase in the thickness of the boundary layer $\delta_1$ towards the trailing edge 1 leads to correspondingly greater turbulence or eddies arising in the region of the trailing edge 1. In particular, so-called bales of turbulence are encountered in that region of the trailing edge 1. These bales of turbulence are at least partially disrupted or their formation is prevented respectively by the proposed spike-shaped trailing edge. For this purpose, the inclination of the flanks of the spikes 8 (pursuant to FIG. 2) should be adjusted as much as possible to these bales of turbulence. The size of the spikes 8 or the space between these should also be adjusted as much as possible to these bales of turbulence. Accordingly, it has been found that the spikes and the space between these cannot be too large or too small. If they are large, such bales of turbulence may linger between two spikes. If the spikes are too small, they will have very little influence on the bales of turbulence. It has thereby been found that the size and manner of the bales of turbulence may depend on the radius at which they occur. The spikes thereby adapt to these radius-dependent bales of turbulence.

FIG. 5 shows a sample progression of the height H of spikes 8 of a trailing edge 1 as a function of the radius r. The progression shown is that of a rotor blade of a strong wind turbine. The height H thereby initially increases as the radius r increases, and then decreases again as the radius r continues to increase. The middle curve $H_1$ shows this progression. In addition, a curve $H_2$ is shown, which shows a very low, possible progression of the height H, and accordingly a curve $H_3$ is shown, which correspondingly shows a very large value progression of the height H. These curves $H_2$ and $H_3$ may form limiting curves, within which a curve $H_1$ is preferably selected.

Figure 6:
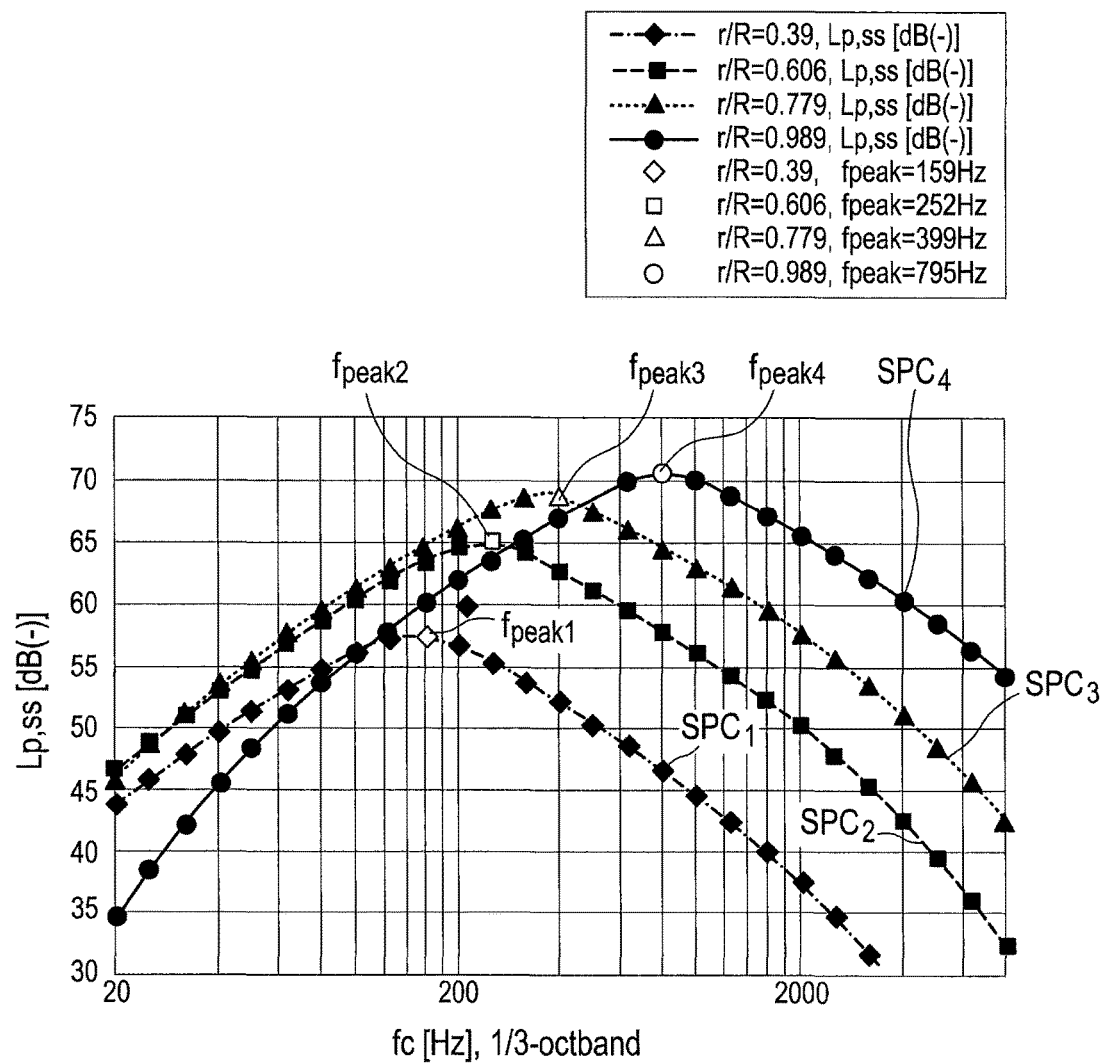
FIG. 6 shows frequency spectra at selected sample radius positions of an embodiment.

FIG. 6 shows four frequency spectra: $SPC_1$, $SPC_2$, $SPC_3$ and $SPC_4$. These are noise spectra or sound spectra for an installation operating point of the underlying wind power installation at four selected sample radius positions. These four frequency spectra $SPC_1$, $SPC_2$, $SPC_3$ and $SPC_4$ were recorded at the radius positions $r_1=0.39$, $r_2=0.606$, $r_3=0.779$ or $r_4=0.989$ respectively. For this purpose, the peak frequencies $f_{peak1}$, $f_{peak2}$, $f_{peak3}$ and $f_{peak4}$ were selected accordingly. Each of these noise spectra has a maximum point and the corresponding frequencies are used further as peak frequencies $f_{peak}$ as described. Such a result arises when the noise spectra are recorded at different radial positions of the rotor blade at an operating point of the wind power installation. A radius-dependent function of the maximum values of the peak frequencies and/or a radius-dependent function of the resulting, calculated spike heights H(r) can be determined therefrom.

Figure 7:
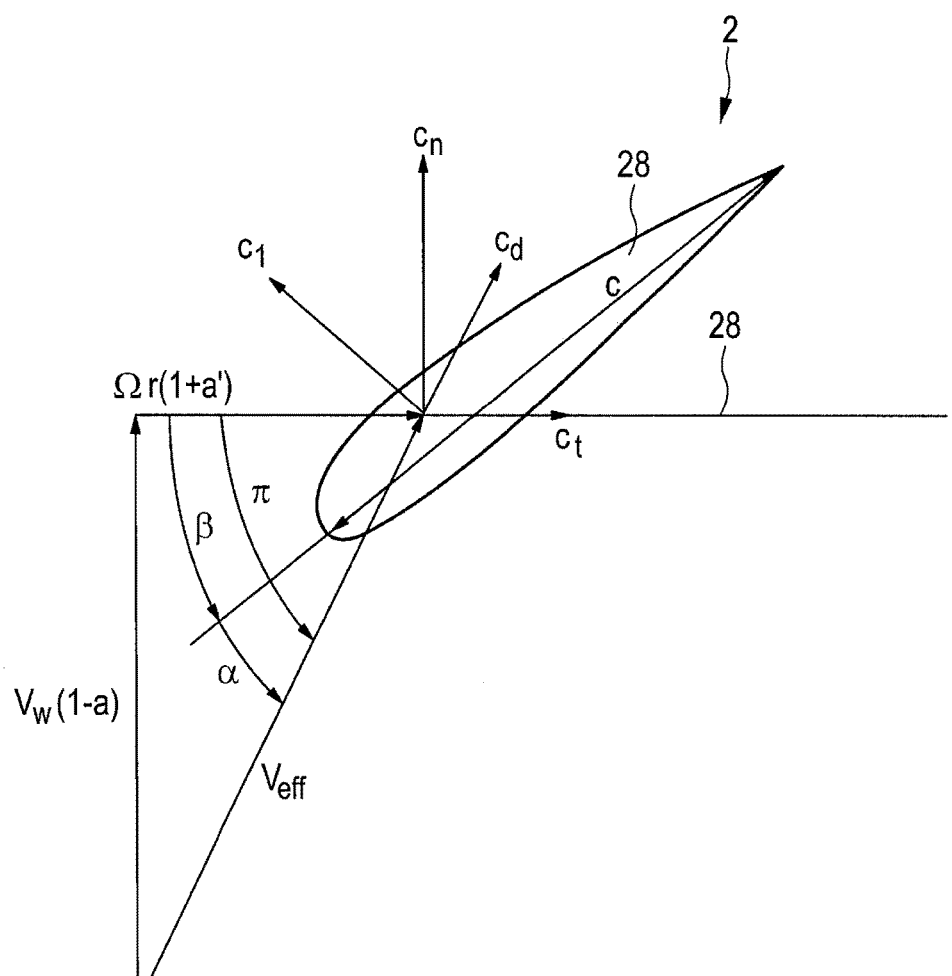
FIG. 7 shows local, aerodynamic parameters that are the basis for a BEM calculation or that are calculated therewith respectively.

FIG. 7 shows local, aerodynamic parameters for a sample blade profile 18 of a rotor blade 2, which is rotating at the rotational speed Ω along the rotor plane 28, which parameters are needed for a BEM calculation or which are calculated therewith respectively. A vector is drawn for the rotational speed of the rotor Ω, which is opposite to the actual direction of the rotational speed, in order to indicate an associated, calculated wind opposing the movement. The vectorial addition of this calculated wind with the wind or the wind speed $V_W$ thus leads to an effective flow velocity $V_{eff}$.

FIG. 7 thereby illustrates the rotational speed of the rotor Ω, the effective blade angle α, the local installation angle β, which comprises the pitch angle and the torsion of the rotor blade, and the angle of incidence π. In addition, the local profile depth c of the blade profile 18 shown is also plotted. Further, relevant variables are explained in the following table.

| | |
|---|---|
| Ω [m/s] | rotational speed |
| α [°] | effective blade angle |
| β [°] | local installation angle = local torsional angle plus blade pitch angle |
| λ [m] or [mm] | spike width |
| $\Lambda_{p,3}$ [m] or [mm] | span width coherence length of the turbulent pressure fluctuation as a function of the peak frequency $f_{peak}$ |
| φ [°] | inflow angle |
| $V_{eff}$ [m/s] | effective flow velocity |
| $V_W$ [m/s] | wind speed |
| a' | tangential induction factor |
| a | axial induction factor |
| $c_l$ | lift coefficient |
| $c_n$ | normal force coefficient |
| $c_d$ | resistance coefficient |
| $c_t$ | tangential force coefficient |
| c [m] | profile depth |
| c1 | constant = 0.7 |
| c2 | constant = 4 . . . 12 |
| dB (—) | decibels (unweighted) |
| fc[Hz] | mid-range frequency in the third-octave band |
| fpeak [Hz] | frequency at which the projected sound pressure level engages. Sound Pressure Level (SPL) at its maximum value |
| h [m] or [mm] | half spike height |
| H [m] or [mm] | spike height H = 2 h |
| Lp, ss [dB(—)] | sound pressure level of the profile suction side |
| MAX Lambda p, 3 [mm] | $\Lambda_{p,3}$ coherence length in reference to the maximum of the sound pressure level Lp, ss and of the peak frequency fpeak |
| r [m] | local radius position on the blade |
| R [m] | rotor radius |
| $U_c = 0.7\ V_{eff}$ [m/s] | convection velocity eng. convective velocity |

The use in connection with a BEM calculation can be found in reference [1].

Now the coherence length scale in particular can also be calculated.

The radius/span width coherence length scale of the turbulent pressure fluctuations was calculated using the Corcos model [3] according to the following equation, $$\Lambda_{p3} = \frac{U_c}{(2 \cdot \pi \cdot f_{peak})}$$

wherein $U_c = c_1 \cdot V_{eff}$ $c_1$ is a constant having a value of 0.7. $U_c$ is known as convection velocity. The effective or local flow velocity $V_{eff}$ on the blade profile of the radius/span width position r is determined by a calculation using a blade element momentum method (BEM), see FIG. 7. The BEM also provides all other needed local flow parameters such as the effective blade angle α, Reynolds (Re) and Mach (Ma) numbers. The parameter $f_{peak}$ is the frequency at which the trailing edge noise spectrum of the boundary layer reaches its maximum. This parameter can either be determined by means of dedicated wind tunnel experiments on the profile, in which the frequency spectrum of the wall pressure fluctuations of the turbulent boundary layer at a point in the immediate vicinity of the trailing edge of the profile is measured, or can be numerically determined using any theoretical noise prediction model.

The noise spectrum and the peak frequency $f_{peak}$ can be determined empirically, for example by conducting dedicated experiments in the wind tunnel, for example with dynamic pressure sensors at the trailing edge of the wind tunnel specimen, or can be calculated using a numerical aeroacoustic simulation for the local Reynolds number Re. The local Reynolds number is obtained from the local angle of incidence α, the local flow velocity and the local profile depth, and can also be obtained as a result using the specified BEM. Furthermore, the two-dimensional profile geometry of the local blade profile is also included.

$\Lambda_{p3}$ is determined for each profile along the blade span width through the use of the process described above.

The following formulas were used for the definition of the local geometric dimension of the trailing edge spikes:

spike height H as a function of the dimensionless radius $$H\left(\frac{r}{R}\right) = c_2 \cdot \Lambda_{p3}\left(\frac{r}{R}\right)$$

And spike distance $$\lambda = \frac{H}{2}$$

Wherein $c_2 = c_{onst}$ is an empirical constant in the range of values from 4 to 15. In a preferred embodiment, $c_2 = 8$.

Figure 8:
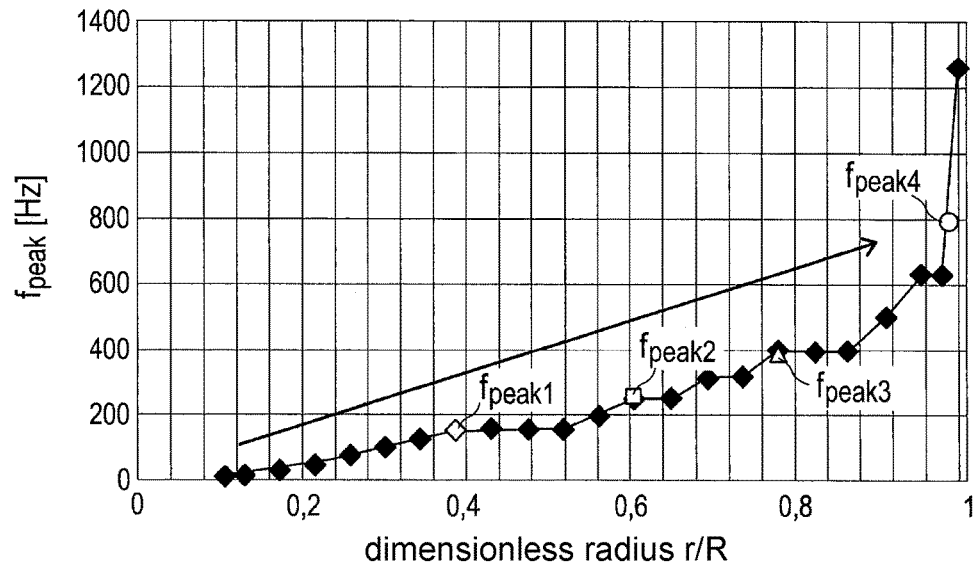
FIG. 8 shows the peak frequency for an embodiment as a function of the radius.

FIG. 8 shows a diagram, which illustrates the peak frequency $f_{peak}$ as a function of the radius for an operating point. The peak frequencies $f_{peak1}$ to $f_{peak4}$ correspond to those in FIG. 6 and were obtained as described in FIG. 6. In the illustration, a dimensionless illustration was selected for the radius, namely the radius r standardized to the maximum radius R. By way of illustration, many recorded peak frequencies that are a function of the radius r have been plotted and each connected by a line. The illustration shows that the peak frequencies are also higher as the radius increases. Consequently, it can be seen in this illustration that the frequency of the maximum noise or of the maximum sound respectively shifts to higher values as the radius r increases. This can be explained by the fact that bales of turbulence, which can also referred to as turbulence eddies, become smaller as the radius increases.

Figure 9:
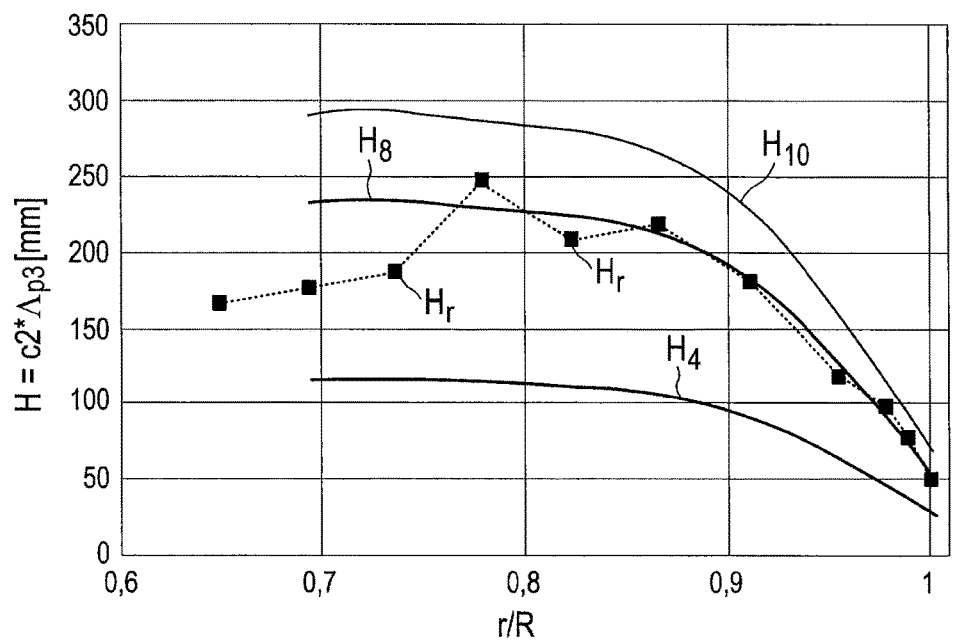
FIG. 9 shows a diagram of different possible progressions of the spike height H as a function of the radius for a strong wind turbine.

FIG. 9 shows the spike height H as a function of the radius r standardized to the maximized radius R. In this diagram, as in the diagram in FIG. 10, only the region of the outer third of the rotor blade being examined is shown. There are 11 discrete values $H_r$ shown in the diagram as a function of the standardized radius, each depicted as a small square. These values were recorded independently by determining a single peak frequency for each respective radius. These discrete spike heights $H_r$ all pertain to the same operating point. A functional correlation is now determined for these discrete values $H_r$, which is illustrated as curve $H_8$. This curve $H_8$ represents a polynomial approximation of these discretely recorded values $H_r$. Such an approach by means of polynomials can be carried out, for example, by minimizing the standard deviations or the sum of the squares of the deviations. In principle, other approaches may be used such as, for example, a polynomial of a higher or lower degree. This approximated progression $H_8$ can also be specified as $H = c_2 \cdot \Lambda_{p3}$, wherein here, $c_2$ has the value 8 ($c_2 = 8$). This radius-dependent function $H_8$ thus determined thereby indicates progression of the height of the spikes as a function of the radius for an operating point. For other operating points, there are other progressions of the spike height H, which can be expressed by another value for $c_2$.

Accordingly, the progressions $H_4$ and $H_{10}$ show corresponding progressions of the spike height H for other operating points, wherein the operating point is equal to the respective curve $H_4$ or $H_{10}$ respectively for each of the radii shown. It has been found that the inclusion of the discrete $H_r$, value for other operating points is not necessary and modifying the constant $c_2$ is sufficient in order to represent the progressions of the spike heights H as a function of the radius for other operating points of this kind with good accuracy.

Figure 10:
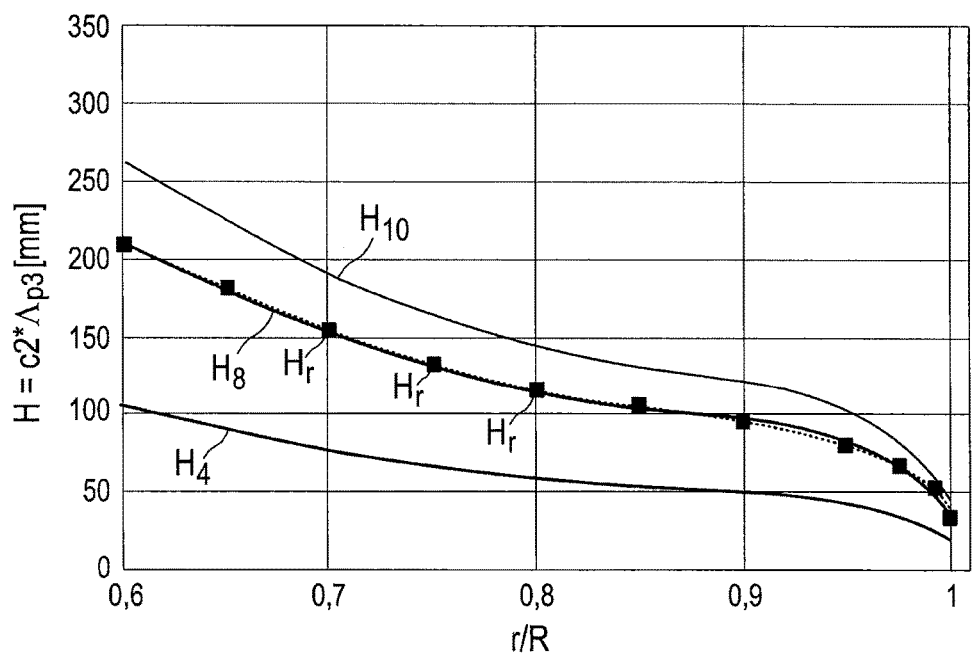
FIG. 10 shows a diagram of different possible progressions of the spike height H as a function of the radius for a low wind turbine.

FIG. 9 shows the correlations for a strong wind turbine having a design tip speed ratio of 7, namely for a wind power installation by Enercon having the model number E82. FIG. 10 shows progressions that are very similar to FIG. 9, but for a low wind turbine, namely an E92-1 model installation from Enercon. In this case as well, height progressions H for different operating points are shown, and for improved clarity, the same designations are used as in FIG. 9. Thus, a function $H_8$ exists for an operating point, which approximates multiple discretely recorded values $H_r$ by means of a fifth degree polynomial. The progression $H_4$ or $H_{10}$ respectively arises for other operating points. The progressions $H_8$, $H_4$ and $H_{10}$ are based on the functional correlation $H = c_2 \cdot \Lambda_{p3}$ with $c_2 = 8$, $c_2 = 4$ or $c_2 = 10$ respectively.

In order to obtain a continuous progression along the span width, $$\Lambda_{p3}\left(\frac{r}{R}\right)$$

was thus calculated at various discrete span width positions and used in the definition of a polynomial of the sixth order by means of an optimal curve fitting. In so doing, the number of polynomial members, namely $$\left(\frac{r}{R}\right)^0 \text{ to } \left(\frac{r}{R}\right)^5,$$

was used to designate the order and thus this designates a fifth degree polynomial.

In the case of the example pursuant to FIG. 9, the resulting fifth degree polynomial for the spike height H as a function of the dimensionless blade radius is:

$$H\left(\frac{r}{R}\right) = c_2 \cdot \Lambda_{p3} = c_2 \cdot \left[66808\left(\frac{r}{R}\right)^5 - 281611\left(\frac{r}{R}\right)^4 + \right.$$
$$\left. 471582\left(\frac{r}{R}\right)^3 - 392499\left(\frac{r}{R}\right)^2 + 162465\left(\frac{r}{R}\right) - 26738\right]$$

The preferred progression, which is shown in FIG. 9 as progression $H_8$, arises where $c_2=8$.

The design range was denoted in FIG. 9 by the limiting curves $H_4$ where $c_2=4$ as well as $H_{10}$ where $c_2=10$. The line with quadratic symbols depicts the progression of the $\Lambda_{p3}$ values calculated at discrete locations.

FIG. 10 thereby shows the design for a low wind turbine having a tip speed ratio of 9. Again, the design range was shown as in FIG. 9, with $H_4$ for $c_2=4$ and with $H_{10}$ for $c_2=10$. The line with the quadratic symbols depicts the progression of the $\Lambda_{p3}$ values calculated at discrete locations. Here, the sixth degree polynomial for a continuous progression is as follows:

$$H\left(\frac{r}{R}\right) = c_2 \cdot \Lambda_{p3} =$$
$$c_2 \cdot \begin{bmatrix} 60351.47\left(\frac{r}{R}\right)^6 - 278386.84\left(\frac{r}{R}\right)^5 + -534315.59\left(\frac{r}{R}\right)^4 + \\ 546057.47\left(\frac{r}{R}\right)^3 - 313179.86\left(\frac{r}{R}\right)^2 + 95422.62\left(\frac{r}{R}\right) - 12015.31 \end{bmatrix}$$

The preferred progression, which is illustrated in FIG. 10 as $H_8$, arises where $c_2=8$.

The domain of the polynomial extends over a dimensionless radius $$\frac{r}{R} = 0.5$$

to 1.0. In the preferred case, the range falls between $$\frac{r}{R} = 0.65$$

to 1.0, however at minimum a range of $$\frac{r}{R}$$

from 0.7 to 1.0 must be covered.

If a progression of $$\frac{r}{R} < 0.6$$

is being considered, mere is an additional calculation of the $\Lambda_{p3}$ values and the factors of the polynomial members are to be adapted.

In so doing, the calculated local $\Lambda_{p3}$-value is dependent on the local flow condition at the operating point of the wind power installation being considered. Therefore the final dimension of spike height and distance (or equivalent $\Lambda_{p3}\left(\frac{r}{R}\right)$) is selected in such a way that the jagged trailing edge is effective at a selected operating point of the wind power installation, optimally the nominal rating.

The calculation of $$\Lambda_{p3}\left(\frac{r}{R}\right)$$

by means of the Corcos model is not trivial, and can be done more precisely by means of a two-point correlation of wall pressure fluctuation measurements in the wind tunnel near the trailing edge of the profile, as set forth in reference [2].

Figure 11:
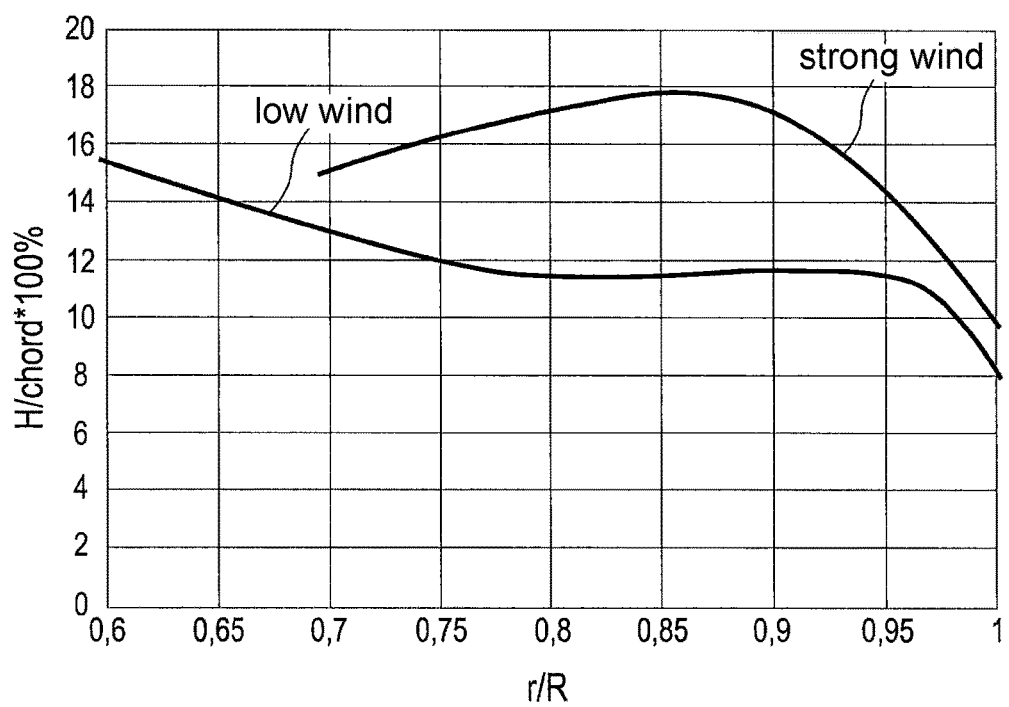
FIG. 11 shows a diagram of the progression of spike heights, which are scaled for the respective local profile depth over the dimensionless radius for strong wind and low wind design.

FIG. 11 shows a diagram of the progression of spike heights for one or two embodiments respectively, which heights are scaled for the respective local profile depth over the dimensionless radius for strong wind and low wind design. It can be seen that the design for strong wind has a different characteristic. It is proposed that this be taken into consideration in the design of the spike heights.

Here, FIG. 12a, and moreover FIGS. 12b, 13a and 13b are calculated to scale. It can be seen that the spike height H decreases substantially from a small local radius $r_1$ to a large local Radius $r_2$. In order to illustrate this, the spike height $H_1$ is drawn for the small radius $r_1$ and the small spike height $H_2$ is drawn for the large radius $r_2$. Here, the trailing edge shown is illustrated separately and must still be mounted on a rotor blade for a strong wind turbine. Here, the trailing edge 1 that is shown has a length of approximately 12 meters. It can be seen that the height $H_1$ is significantly greater than the height $H_2$ and that the spike height H of the spikes 8 initially remains the same and then drops off sharply at the large, which is to say the outer radius $r_2$. Due to the simultaneously diminishing profile depth, the relative spike height H of the spikes 8 thus initially increases, namely the spike heights in reference to the respective profile depth, and then drops off at the end of the rotor blade, namely at $r_2$.

The illustration in perspective pursuant to FIG. 12b again illustrates the progression of the spike height. It can be seen in both figures that along with the spike height, the spike width or the spike distance diminish.

FIGS. 13a and 13b pertain to a trailing edge 1 for a low wind turbine. It can also be seen that there is a substantial decrease from the spike height $H_1$ to the spike height $H_2$, namely from a small radius $r_1$ to a large radius $r_2$. The radii $r_1$ and $r_2$ of FIG. 13a on the one hand, and the FIGS. 12a and 12b on the other hand, differ from one another in terms of size. At the same time, both trailing edges 1 in FIGS. 12a and 12b on the one hand, and FIG. 13a on the other, are provided for an outer third of the respective rotor blade. In addition, both trailing edges 1 are further divided into segments $S_1$ to $S_5$, wherein despite differing trailing edges 1, the same reference signs were used in order to facilitate a comparison. The fifth segment $S_5$ of the trailing edge 1 of the FIG. 13a is also divided into additional sub-segments. In FIG. 13a, it can be seen that the spike height H has already decreased in the second segment, whereas a decrease in the second segment of the trailing edge for the strong wind turbine pursuant to FIG. 12 is not discernible in the second segment $S_2$ and does not exist. In that regard, the height progression of the spike height H of the trailing edge 1 for strong wind turbines pursuant to FIGS. 12a and 12b differs from the progression pursuant to FIG. 13a for a low wind turbine.

FIG. 13b also shows a section of the trailing edge 1 of the low wind turbine, in order to clarify a possible structural embodiment, in particular of the spikes 8. Accordingly, it can initially be seen that the spikes 8 are connected with one another along a base 30. The spike height H is measured from the base line or base 16, at which the apexes of the recesses 12 are also arranged. FIG. 13b also shows that the spike tip 10 may be provided with a slight rounding.

[1] Theory and User Manual BLADOPT, ECN report, August, 2011 by B. H. Bulder, S. A. M. Barhorst, J. G. Schepers, F. Hagg

[2] M. S. Howe. Acoustics of Fluid-Structure Interactions. Cambridge University Press, online ISBN: 9780511662898, hardback ISBN: 9780521633208, paperback ISBN: 9780521054287 edition, 1998.

[3] G. M. Corcos. The structure of the turbulent pressure field in boundary-layer flows. Journal of Fluid Mechanics, 18:353-378, 1964.

[4] Andreas Herrig, Validation and Application of a Hot-Wire based Method for Trailing-Edge Noise Measurements on Airfoils, PhD Thesis, University of Stuttgart, 2011, ISBN 978-3-8439-0578.

From a manufacturing standpoint, the desired progression is preferably created in that a predefined rear lug is machined by means of an automated, computer-controlled cutting process.

The invention claimed is:

1. A method comprising:
forming a rotor blade for a wind power installation, the rotor blade having radial positions with respect to an aerodynamic rotor when the rotor blade is attached to the aerodynamic rotor, the rotor blade having a local blade profile that is dependent on the radial positions with respect to the aerodynamic rotor and a trailing edge, the trailing edge including a jagged profile having a plurality of spikes, each spike having a spike height and a spike width, wherein at least one of the spike heights and spike widths are calculated as a function of at least one of a radial position of the respective spike and a local blade profile of a radial position of the respective spike, wherein calculating the spike height of a particular radial position is calculated from an associated coherence length scale $\Lambda_{p3}$, taking into account a constant factor $c_2$, using the following formula, where H is spike height:

$$H = c_2 \cdot \Lambda_{p3}.$$

2. The method according to claim 1, wherein the spike height is greater than the spike width for each spike.

3. The method according to claim 2, wherein a ratio of the spike height to the spike width falls in a range of 0.5 to 10.

4. The method according to claim 1, wherein at least one of the spike height and the spike width depends on a local radius of the respective spike based on a polynomial relationship.

5. The method according to claim 1, wherein each of the spikes have at least one of a different spike width and a different spike height from each other.

6. The method according to claim 1, wherein the spike heights and the spike widths are calculated so that the spike height of the spikes decrease as the radius of the radial position of the respective spikes increases.

7. The method according to claim 1, wherein the at least one of spike heights and spike widths are calculated depending on at least one of one or more anticipated noise spectra and one or more operating points for the wind power installation.

8. The method according to claim 1, wherein the function includes a peak frequency that is a frequency of a greatest anticipated noise level of an anticipated noise spectrum at a selected operating point of the wind power installation.

9. The method according to claim 1, wherein the at least one of spike heights and spike widths are calculated depending on at least one of the local profile of the respective spikes and the local anticipated flow velocity for at least one operating point of the wind power installation.

10. The method according to claim 1, wherein the function includes a peak frequency that is a frequency of an average frequency from anticipated noise spectra at multiple operating points of the wind power installation.

11. A method comprising:
forming a rotor blade for a wind power installation, the rotor blade having radial positions with respect to an aerodynamic rotor when the rotor blade is attached to the aerodynamic rotor, the rotor blade having a local blade profile that is dependent on the radial positions with respect to the aerodynamic rotor and a trailing edge, the trailing edge including a jagged profile having a plurality of spikes, each spike having a spike height and a spike width, wherein at least one of the spike heights and spike widths are calculated as a function of at least one of a radial position of the respective spike and a local blade profile of a radial position of the respective spike, wherein calculating the spike height of a particular radial position is calculated from an associated flow velocity $V_{\it eff}$, an associated peak frequency $f_{peak}$ of noise spectrum and a predetermined factor k using the following formula, where H is spike height:

$$H = k \cdot \frac{V_{\it eff}}{f_{peak}}.$$

12. A rotor blade of an aerodynamic rotor of a wind power installation, comprising:
a rotor blade body having radial positions with respect to the rotor, wherein the rotor blade has a local blade profile that is dependent on the radial positions with respect to the rotor; and
a trailing edge coupled to the rotor blade body and having a jagged profile with a plurality of spikes, wherein each spike has a spike height and a spike width, and at least one of the spike height and the spike width is a function of the radial position of the respective spike and a local blade profile at the radial position of the respective spike,
wherein the spike height of a particular radial position corresponds to an associated coherence length scale $\Lambda_{p3}$, taking into account a constant factor $c_2$, using the following formula, where H is spike height:

$$H = c_2 \cdot \Lambda_{p3}.$$

13. The rotor blade according to claim 12, wherein the spike height is greater than the spike width and the ratio of the spike height to the spike width falls in a range of 0.5 to 10.

14. The rotor blade according to claim 12, wherein at least one of the spike height and the spike width depends on the radial position of the respective spike by a polynomial function.

15. The rotor blade according to claim 14, wherein the polynomial function is a fourth to eighth degree polynomial function.

16. The rotor blade according to claim 12, wherein the plurality of spikes have at least one of spike widths and spike heights that vary in relation to one another.

17. The rotor blade according to claim 12, wherein the spike height decreases as the radius of the rotor blade increases.

18. The rotor blade according to claim 12, wherein the spike height initially increases as the radius of the rotor blade increases, and then decreases as the radius of the rotor blade continues to increase.

19. A wind power installation having a rotor blade according to claim 12.

* * * * *